United States Patent
Urakawa

(10) Patent No.: US 8,587,813 B2
(45) Date of Patent: Nov. 19, 2013

(54) FACSIMILE APPARATUS CONFIGURED TO DISPLAY IMAGE DATA ON A DISPLAY SECTION

(75) Inventor: Yutaka Urakawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 325 days.

(21) Appl. No.: 13/069,688

(22) Filed: Mar. 23, 2011

(65) Prior Publication Data

US 2011/0242597 A1  Oct. 6, 2011

(30) Foreign Application Priority Data

Mar. 30, 2010 (JP) ................................. 2010-077041

(51) Int. Cl.
- G06F 15/00 (2006.01)
- G06F 3/12 (2006.01)
- G06K 1/00 (2006.01)

(52) U.S. Cl.
USPC .......................................... 358/1.15; 358/1.13

(58) Field of Classification Search
None
See application file for complete search history.

(56) References Cited

U.S. PATENT DOCUMENTS

| | | | |
|---|---|---|---|
| 2007/0019246 A1 | 1/2007 | Kabeya | |
| 2009/0161168 A1* | 6/2009 | Miyamoto | 358/442 |
| 2010/0067063 A1* | 3/2010 | Jang | 358/402 |

FOREIGN PATENT DOCUMENTS

| | | |
|---|---|---|
| JP | 62-171262 | 7/1987 |
| JP | 05-327962 | 12/1993 |
| JP | 08-202887 | 8/1996 |
| JP | 10-150551 | 6/1998 |
| JP | 2002-314793 | 10/2002 |
| JP | 2007-052407 | 3/2007 |

OTHER PUBLICATIONS

Office Action for corresponding Japanese Patent Application 2010-077041 dtd. Apr. 24, 2012.

* cited by examiner

*Primary Examiner* — Douglas Tran
(74) *Attorney, Agent, or Firm* — Banner & Witcoff, Ltd.

(57) ABSTRACT

A multifunction apparatus generates image data. The multifunction apparatus displays the image data on a touch panel. The multifunction apparatus accepts an input of a permission to transmit the image data to a receiving-side multifunction apparatus. The multifunction apparatus sets a display parameter to specify a display mode when the image data received by the receiving-side multifunction apparatus is displayed on a touch panel of the receiving-side multifunction apparatus. The multifunction apparatus transmits the image data together with the display parameter to the receiving-side multifunction apparatus in response to the acceptance of the input of the permission to transmit the image data.

15 Claims, 13 Drawing Sheets

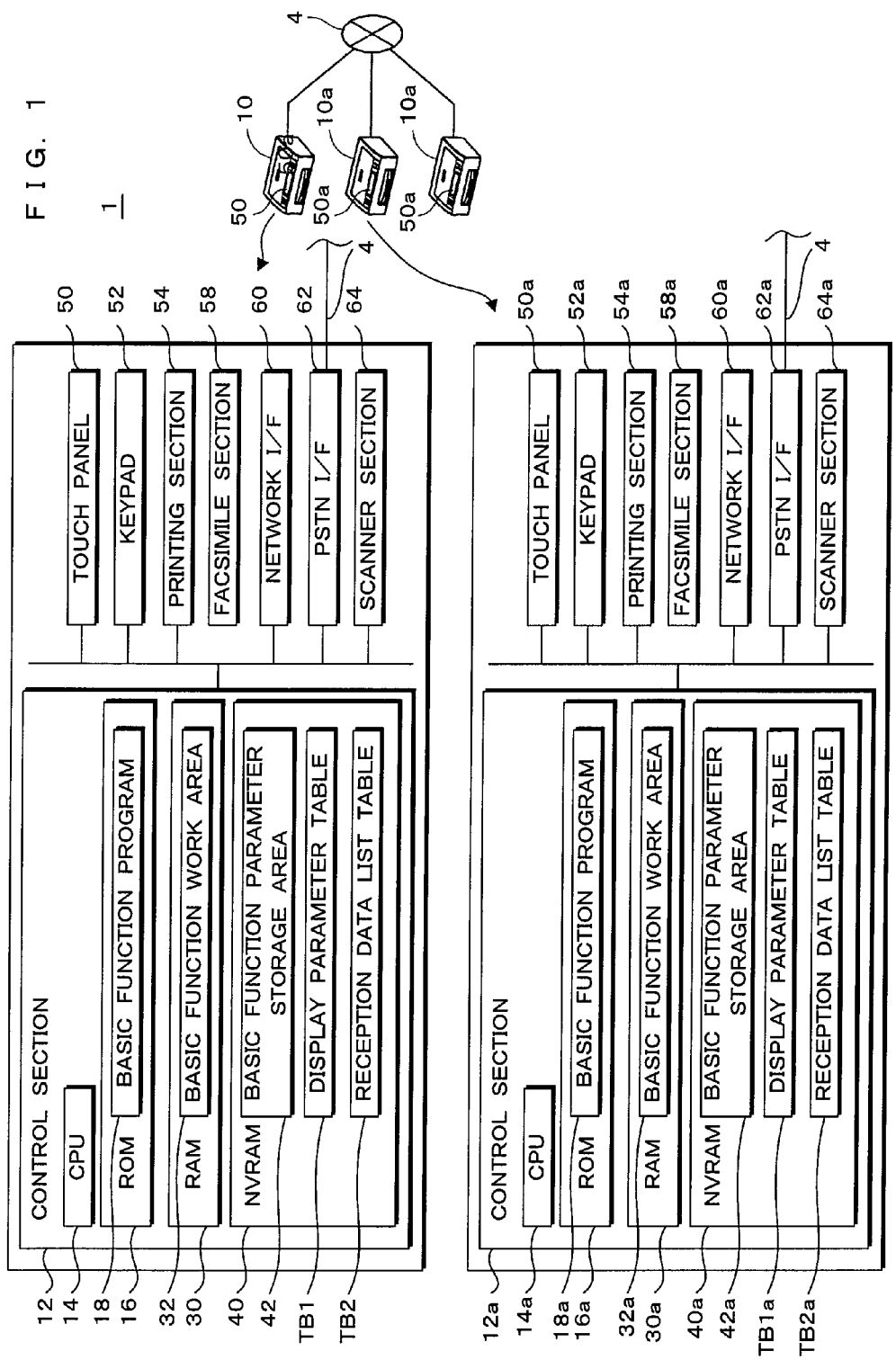

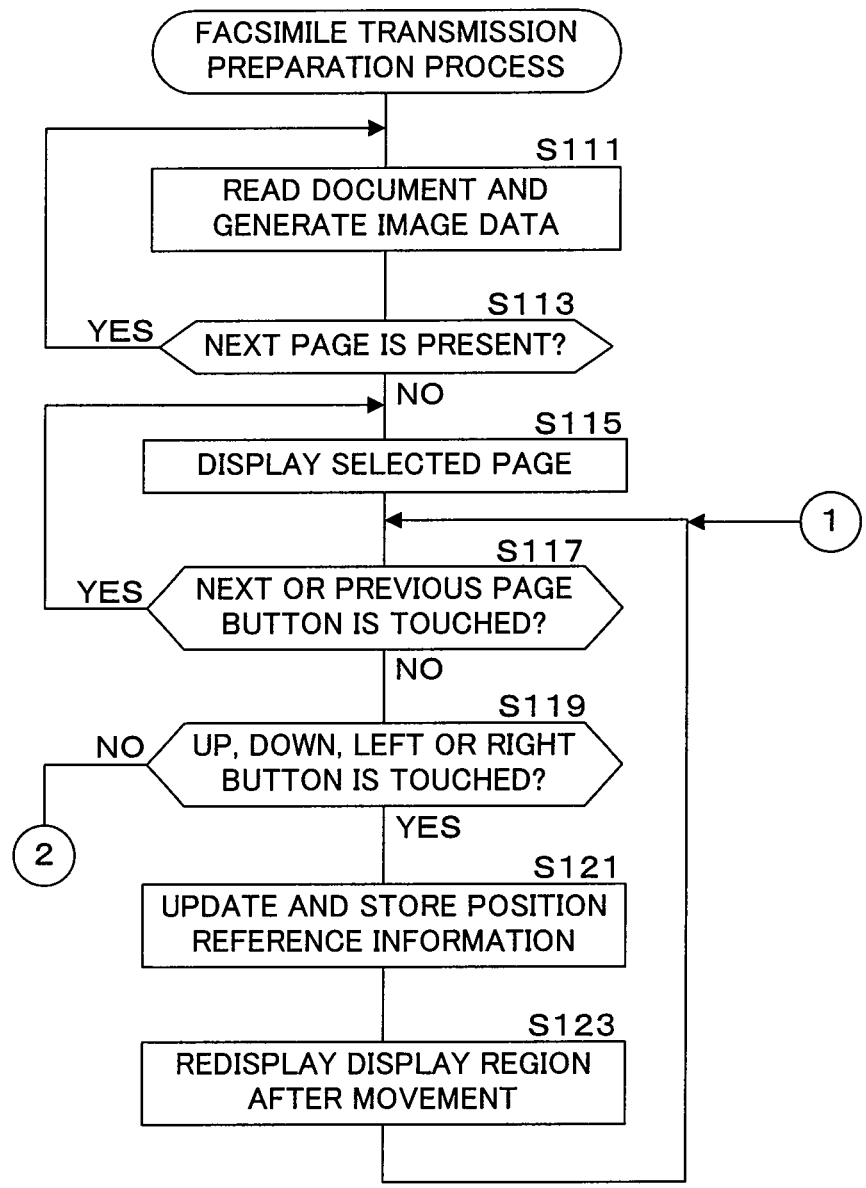

F I G. 1 0

| PAGE NUMBER | POSITION REFERENCE INFORMATION (X, Y) | ROTATIONAL DISPLAY INFORMATION |
|---|---|---|
| 1 | (30, 60) | 0 DEGREES |
| 3 | (0, 0) | 90 DEGREES RIGHTWARD |
| 5 | (30, 0) | 90 DEGREES LEFTWARD |

F I G. 1 1

| RECEPTION NUMBER | ORIGINATOR NUMBER | RECEPTION TIME | DISPLAY PARAMETER INFORMATION |
|---|---|---|---|
| 1 | ○○○-○○○○ | 2010/3/5 8:30 | PRESENT |
| 2 | △△△-△△△△ | 2010/3/1 22:00 | — |
| 3 | ×××-×××× | 2010/2/27 17:00 | PRESENT |
| 4 | □□□-□□□□ | 2010/2/25 15:30 | — |

TB2, TB2a
211, 212, 213, 214

F I G. 1 2
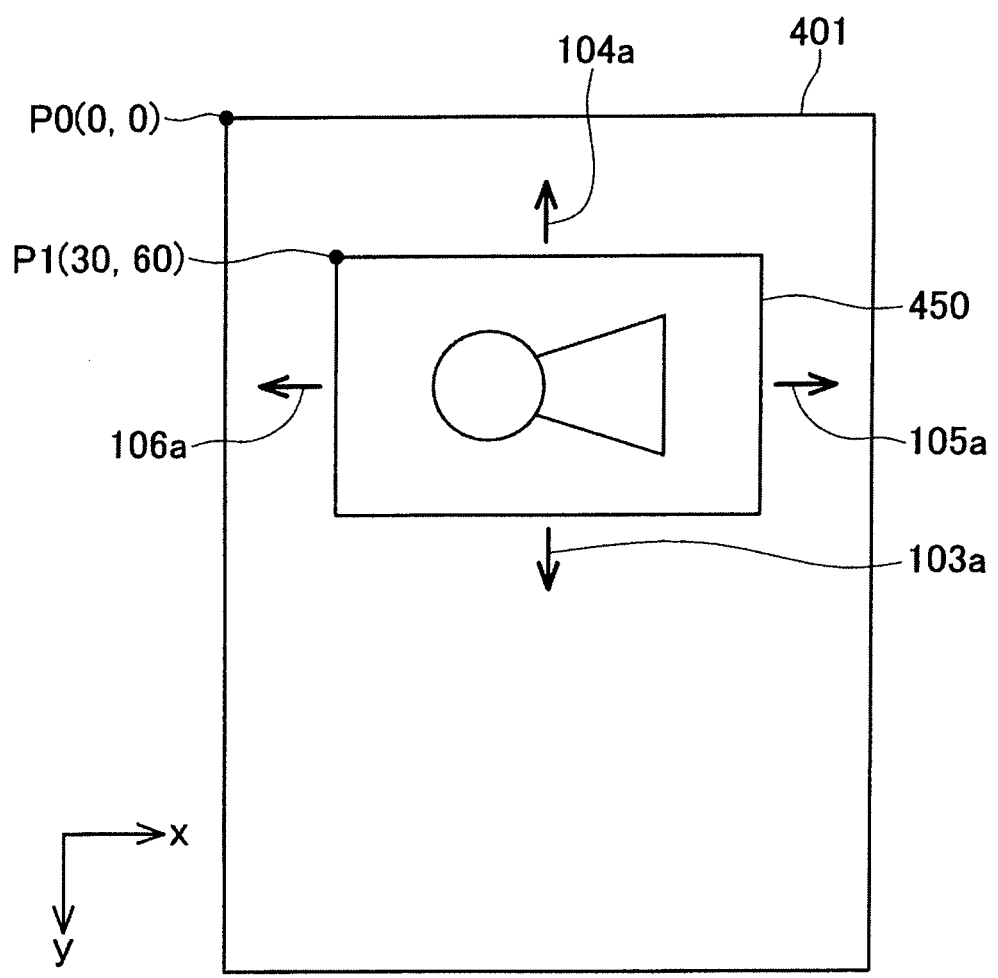

FACSIMILE APPARATUS CONFIGURED TO DISPLAY IMAGE DATA ON A DISPLAY SECTION

CROSS-REFERENCE TO RELATED APPLICATIONS

This Nonprovisional application claims priority under 35 U.S.C. §119(a) on Patent Application No. 2010-077041 filed in Japan on Mar. 30, 2010, the entire contents of which are hereby incorporated by reference.

BACKGROUND

The present invention relates to a facsimile apparatus capable of displaying image data on a display section.

In a facsimile apparatus described in Japanese Unexamined Patent Application Laid-Open No. H05-327962, the received image data is displayed on a display section in a predetermined amount from the head as information related to the user at the transmitting side.

SUMMARY

According to the prior art, image data is evenly displayed in a predetermined amount from the head. However, the user at the transmitting side has in mind a position of the image data (the head portion, the end portion, etc. of the image data) to be displayed or a direction (vertically, horizontally, etc.) in which the image data is to be displayed when the image data is displayed on the apparatus at the receiving side.

An object is to provide a facsimile apparatus capable of resolving such inconvenience.

To achieve the above-mentioned object, a facsimile apparatus is provided with: image data generating means for generating image data; displaying means for displaying the image data on a transmitting-side display section; input accepting means for accepting an input of a permission to transmit the image data to a receiving-side apparatus; display parameter setting means for setting a display parameter to specify a display mode when the image data received by the receiving-side apparatus is displayed on a receiving-side display section of the receiving-side apparatus; and transmitting means for transmitting the image data together with the display parameter to the receiving-side apparatus in response to the input accepting means accepting the input of the permission to transmit the image data.

A facsimile apparatus is provided with: image data receiving means for receiving image data and storing the image data into a storage section; display parameter receiving means for receiving a display parameter to specify a display mode when the image data is displayed on a receiving-side display section and storing the display parameter into the storage section; and displaying means for displaying the image data stored in the storage section on the receiving-side display section by using the display mode specified by the display parameter.

By checking the image data displayed on the transmitting-side display section before making an input to the effect that the image data is transmitted, the transmitting-side user can be prevented from transmitting image data of wrong contents. Moreover, the transmitting-side user can previously specify the display mode of the image data to be displayed on the receiving-side display section.

Then, by using the appropriate display mode specified by the transmitting-side user, the receiving-side user can smoothly check the contents of the image data. Consequently, user convenience can be improved.

The above and further objects and features of the invention will more fully be apparent from the following detailed description with accompanying drawings.

BRIEF DESCRIPTION OF THE SEVERAL VIEWS OF THE DRAWINGS

FIG. 1 is a schematic view of a multifunction network;
FIG. 2 is a flowchart of the operation of a multifunction apparatus (part 1);
FIG. 10 is a view showing an example of a display parameter table;
FIG. 11 is a view showing an example of a reception data list table;
FIG. 12 is a view showing the relationship between the image data and the display region (part 1)

DETAILED DESCRIPTION OF THE EXEMPLARY EMBODIMENTS

Figure 3:
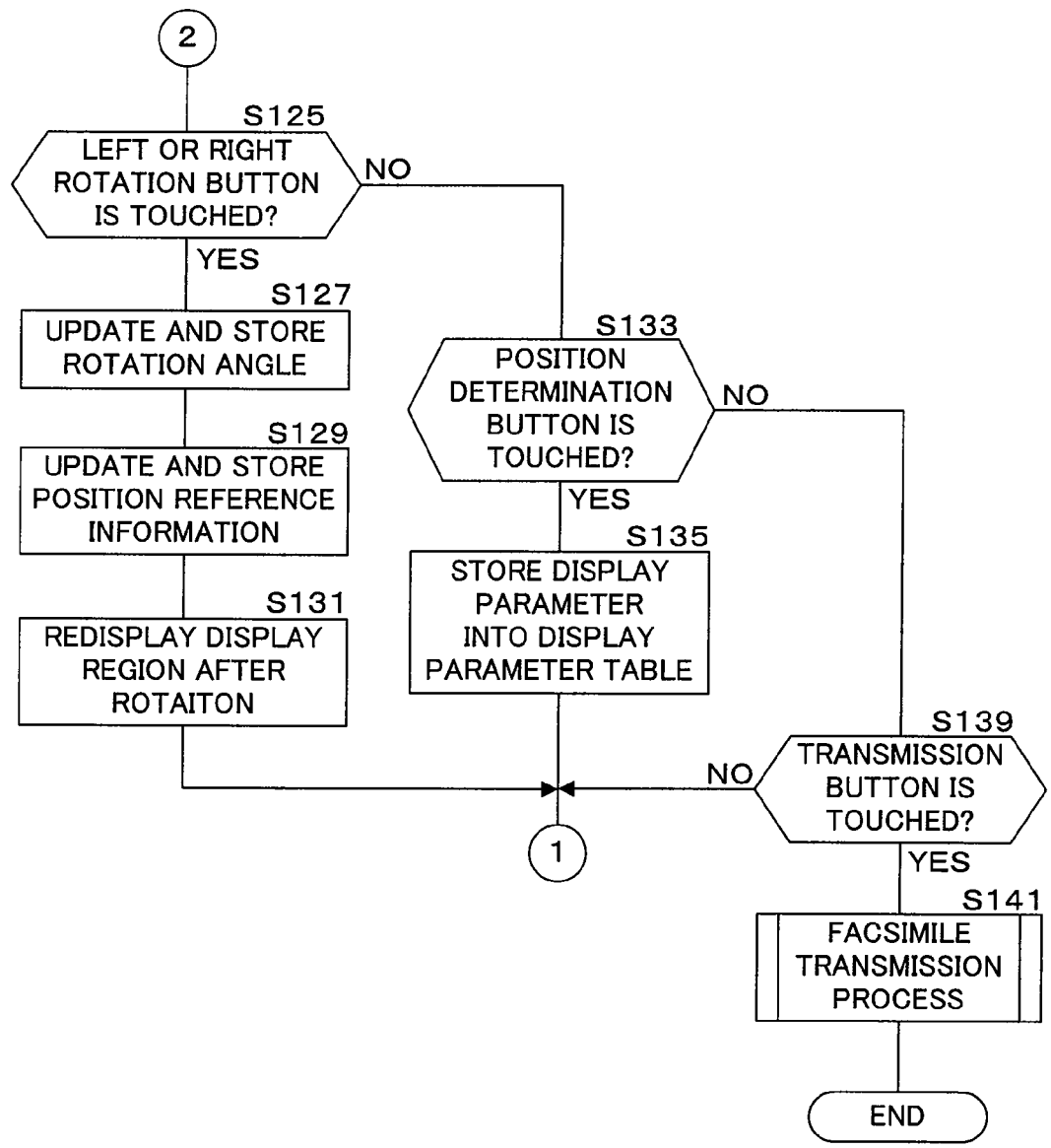
FIG. 3 is a flowchart of the operation of the multifunction apparatus (part 2)

Referring to the drawings, an embodiment will be described. FIG. 1 is a schematic view of a multifunction network 1 of the present embodiment. The multifunction network 1 is provided with multifunction apparatuses 10, 10a and 10b. The multifunction apparatuses 10, 10a and 10b are connected to a telephone network 4, and capable of communicating with one another.

The multifunction apparatus 10 will be described. The multifunction apparatus 10 includes a control section 12, a touch panel 50, a keypad 52, a printing section 54, a facsimile section 58, a network interface 60, a PSTN interface 62, a scanner section 64 and the like. The control section 12 includes a CPU 14, a ROM 16, a RAM 30, an NVRAM 40 and the like. The network interface 60 is connected to the telephone network 4. The multifunction apparatus 10 is capable of communicating with the other multifunction apparatuses 10a and 10b through the telephone network 4. The CPU 14 executes various processes according to various programs stored in the ROM 16. A basic function program 18 is a program for controlling basic operations of the multifunction apparatus 10.

Figure 9:
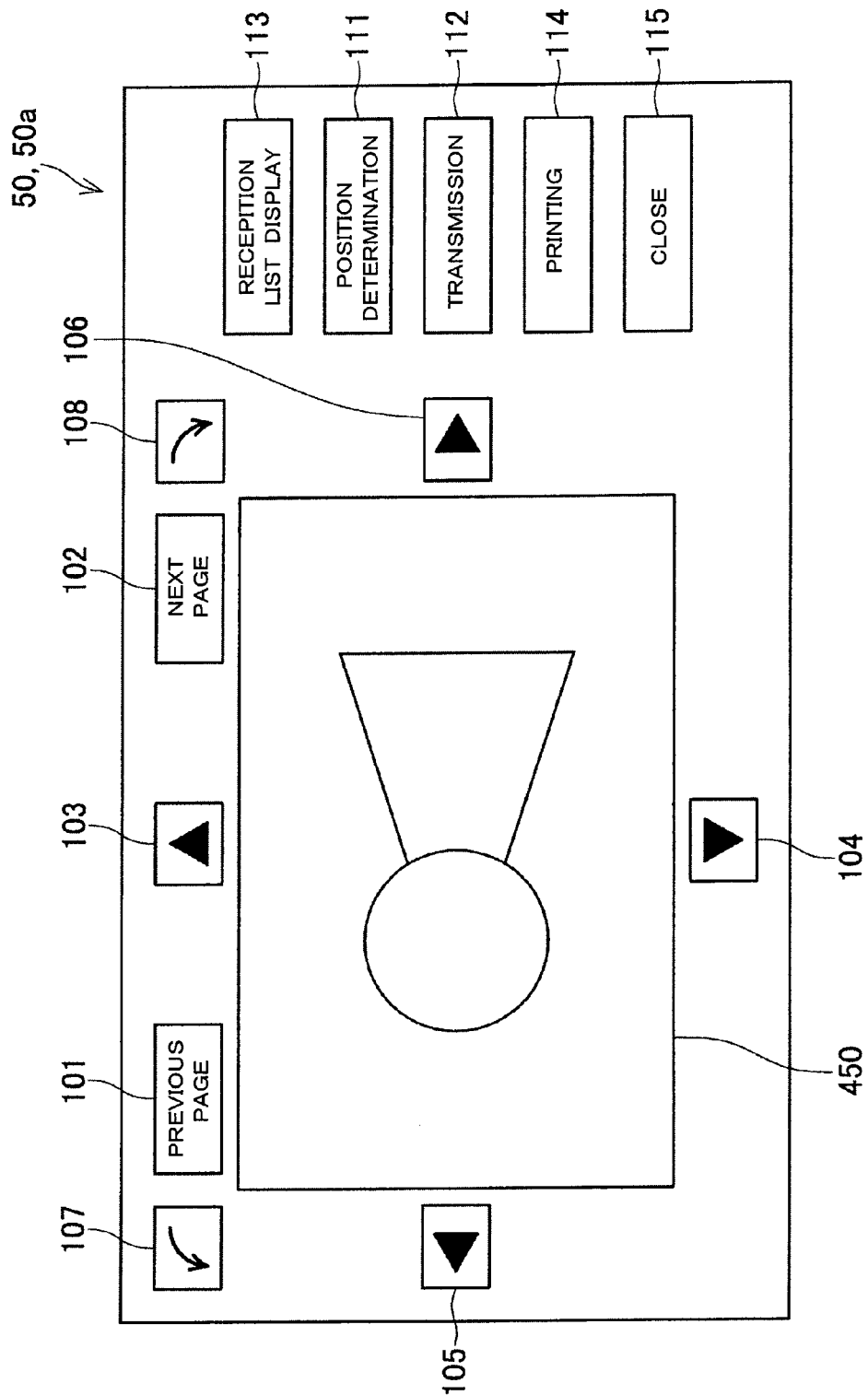
FIG. 9 shows an example of the screen display of a touch panel.

The display contents of the touch panel 50 will be described. FIG. 9 shows an example of the screen display of the touch panel 50. On a display region 450 of the touch panel 50, part of the image data is displayed. The relationship between the image data and the display region 450 will be described by using FIG. 12. One page of image data has an image data region 401. The display region 450 is placed in an arbitrary position on the image data region 401. Since the area of the display region 450 is smaller than that of the image data region 401, part of the image data region 401 is trimmed off by the display region 450, and then the trimmed image data is displayed on the touch panel 50.

On the touch panel 50, a previous page button 101, a next page button 102, an up button 103, a down button 104, a left button 105, a right button 106, a left rotation button 107 and a right rotation button 108 are displayed. A position determination button 111, a transmission button 112, a reception list display button 113, a printing button 114 and a close button 115 are also displayed. Details of these buttons will be described later.

The NVRAM 40 stores a basic function parameter storage area 42, a display parameter table TB1 and a reception data list table TB2. The basic function parameter storage area 42 is a storage area for storing various parameters (for example, printing setting, facsimile setting) used when the CPU 14 executes processes according to the basic function program 18.

The display parameter table TB1 is a table storing a display parameter 310. The display parameter 310 is a parameter to specify the display mode when the image data received by the multifunction apparatus 10 is displayed on the touch panel 50. FIG. 10 shows an example of the display parameter table TB1. The display parameter 310 includes a page number 311, position reference information 312 and rotational display information 313.

The page number 311 is information to specify, of a plurality of pages of image data, the page number assigned to the image data to be displayed on the touch panel 50. The position reference information 312 is information to specify the position serving as the reference when the display region 450 is placed on the image data region 401. As shown in FIG. 12, the position reference information 312 is expressed as coordinates with the origin P0(0,0) at the upper left corner of the image data region 401. The rotational display information 313 is information to specify the amount by which the display region 450 is rotated when the display region 450 is placed on the image data region 401. The rotational display information is expressed as a rotation angle such as 90 degrees rightward, 180 degrees and 90 degrees leftward.

The reception data list table TB2 is a table storing various pieces of information on the received image data. FIG. 11 shows an example of the reception data list table TB2. The reception data list table TB2 stores a reception number 211, an originator number 212, a reception time 213 and display parameter information 214. The reception number 211 is a number representing the order in which the image data is received. A smaller number is assigned to a more newly received piece of data. The originator number 212 is the facsimile number of the originator apparatus transmitting the image data. The reception time 213 is the time when the image data is received.

The display parameter information 214 is information indicating whether the display parameter 310 is added to the received image data or not. When the display parameter is added to at least one of a plurality of pages of image data, it is determined that the display parameter information 214 is "present". Thereby, the user at the receiving side can easily recognize the image data with the display parameter by finding, in the reception data list table TB2, the image data where it is determined that the display parameter information 214 is "present". Consequently, user convenience can be improved.

The RAM 30 has a basic function work area 32. The basic function work area 32 is a storage area for storing various pieces of data generated during execution of processes according to the basic function program 18, and the set display parameter 310.

Moreover, the multifunction apparatus 10a will be described. The multifunction apparatus 10a includes a control section 12a, a touch panel 50a, a keypad 52a, a printing section 54a, a facsimile section 58a, a network interface 60a, a PSTN interface 62a, a scanner section 64a and the like. An NVRAM 40a stores a basic function parameter storage area 42a, a display parameter table TB1a and a reception data list table TB2a. The display parameter table TB1a has a structure similar to that of the display parameter table TB1 of FIG. 10. The reception data list table TB2a has a structure similar to that of the reception data list table TB2 of FIG. 11. The display contents of the touch panel 50a are similar to those of the touch panel 50 of FIG. 9. The other structure of the multifunction apparatus 10a is similar to that of the multifunction apparatus 10. Therefore, detailed description thereof is omitted here.

The operation of the multifunction network 1 will be described by using the flowcharts of FIG. 2 to FIG. 8. A case where the multifunction apparatus 10 is a transmitting-side facsimile apparatus and the multifunction apparatus 10a is a receiving-side facsimile apparatus in FIG. 1 will be described as an example. Moreover, a case where the display parameter 310 is set by using the touch panel 50 of the multifunction apparatus 10 will be described. Moreover, a case where a display based on the display parameter 310 is provided on the touch panel 50a of the multifunction apparatus 10a will be described.

A facsimile transmission preparation performed by the multifunction apparatus 10 (transmitting-side apparatus) will be described by using the flowchart of FIG. 2 and FIG. 3. At S111, the CPU 14 reads the document by the scanner section 64, and generates image data. The CPU 14 also assigns a page number to the image data. At S113, the CPU 14 determines whether the document has a next page or not. When the document has a next page (S113: YES), the CPU 14 returns the procedure to S111, and performs the scanning of the next page of the document. When the document does not have a next page (S113: NO), the CPU 14 ends scanning, and advances the procedure to S115. Thereby, a plurality of pages of image data to which sequential page numbers are assigned can be generated.

At S115 and S117, an operation to select image data for which display parameter setting is performed, from among a plurality of pages of image data is performed. At S115, the CPU 14 displays the image data of the page selected by the user, on the touch panel 50.

At S117, the CPU 14 determines whether the next page button 102 or the previous page button 101 displayed on the touch panel 50 is touched or not. When the next page button 102 is touched (S117: YES), the CPU 14 returns the procedure to S115, and displays the image data of the next page. When the previous page button 101 is touched (S117: YES), the CPU 14 returns the procedure to S115, and displays the image data of the previous page. On the other hand, when neither the next page button 102 nor the previous page button 101 is touched (S117: NO), the CPU 14 determines that the image data selection is completed, and advances the procedure to S119.

At S119 to S135, the setting of the display parameter 310 is performed for the image data of the selected page. By alternately repeating the operation of selecting a page at S115 and S117 and the operation of setting the display parameter 310 at S119 to S135, the setting of the display parameter 310 can be performed for the image data of each of a plurality of pages.

At S119, the CPU 14 determines whether any of the up button 103, the down button 104, the left button 105 and the right button 106 is touched by the transmitting-side user or not. These buttons are for moving the position of the display region 450 on the image data region 401 in FIG. 12. When the up button 103 is touched, the display region 450 moves a predetermined amount in the direction of the arrow 104*a*. When the down button 104 is touched, the display region 450 moves a predetermined amount in the direction of the arrow 103*a*. When the left button 105 is touched, the display region 450 moves a predetermined amount in the direction of the arrow 106*a*. When the right button 106 is touched, the display region 450 moves a predetermined amount in the direction of the arrow 105*a*. Thereby, the display region 450 can be placed in an arbitrary position of the image data region 401. Then, at S121, the coordinates of an upper left corner position P1 of the display region 450 after the movement are stored in the RAM 30 as the position reference information 312. In the example of FIG. 12, P1(30,60) is stored in the RAM 30 as the position reference information 312.

At S123, the CPU 14 redisplays the region trimmed off by the display region 450 after the movement, on the touch panel 50. In the example of FIG. 12, the region trimmed off by the display region 450 is displayed on the touch panel 50 (FIG. 9). Then, the CPU 14 returns the procedure to S117.

Figure 13:
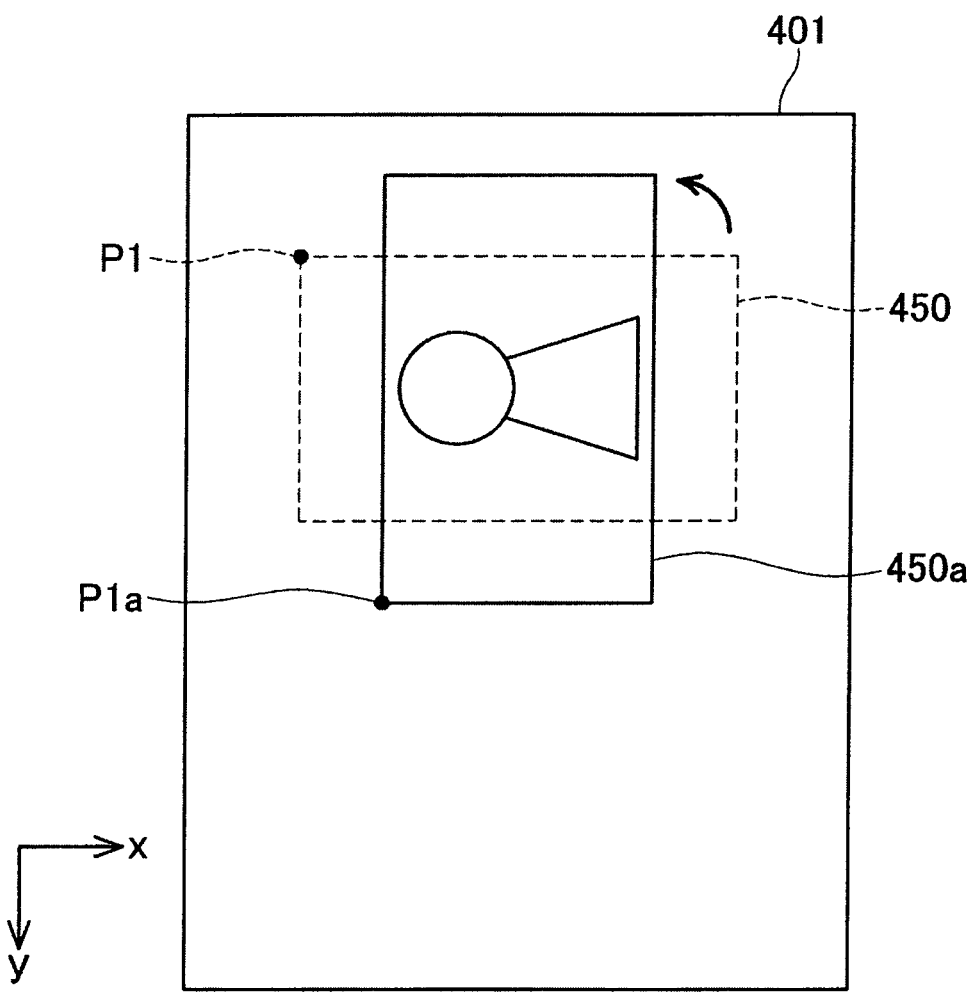
FIG. 13 is a view showing the relationship between the image data and the display region (part 2).

On the other hand, when none of the up button 103, the down button 104, the left button 105 and the right button 106 is touched by the transmitting-side user at S119 (S119: NO), the CPU 14 advances the procedure to S125. At S125, the CPU 14 determines whether the left rotation button 107 or the right rotation button 108 is touched by the transmitting-side user or not. These buttons are for rotating the display region 450 around the center point of the display region 450 in FIG. 13. When the right rotation button 108 is touched, as shown in FIG. 13, the display region 450 rotates 90 degrees leftward into a display region 450*a*. On the other hand, when the left rotation button 107 is touched, the display region 450 rotates 90 degrees rightward. Thereby, the orientation of the display region 450 can be adjusted.

At S127, the CPU 14 stores the rotation angle after the change into the RAM 30 as the rotational display information 313. In the example of the display region 450*a* of FIG. 13, the rotation angle="90 degrees rightward" is stored.

At S129, the CPU 14 updates the position reference information 312 in the display region 450 after the rotation. In the example of FIG. 13, the coordinates of an upper left corner position P1*a* of the display region 450*a* are stored in the RAM 30 as the position reference information 312.

At S131, the CPU 14 redisplays the part trimmed off by the display region after the rotation, on the touch panel 50. In the example of FIG. 13, the region trimmed off by the display region 450*a* is displayed on the touch panel 50. Then, the CPU 14 returns the procedure to S117.

On the other hand, when none of the left rotation button 107 and the right rotation button 108 is touched at S125 (S125: NO), the CPU 14 advances the procedure to S133. At S133, the CPU 14 determines whether the position determination button 111 is touched by the transmitting-side user or not. When the position determination button 111 is touched (S133: YES), the CPU 14 advances the procedure to S135.

At S135, the CPU 14 stores the page number 311, the position reference information 312 and the rotational display information 313 of the page for which display parameter setting is currently performed, into the display parameter table TB1 of FIG. 10. With this, the setting of the display parameter 310 for the page selected by the user is finished. Then, the CPU 14 returns the procedure to S117.

In the example of description of the present embodiment, a case will be described where the display region 450 is placed as shown in FIG. 12 for the image data of the first page. In this case, as shown in FIG. 10, the page number 311=1, the position reference information 312=(30,60) and the rotational display information 313=0 degrees are stored in the display parameter table TB1.

On the other hand, when the position determination button 111 is not touched at S133 (S133:NO), the CPU 14 advances the procedure to S139. At S139, the CPU 14 determines whether the transmission button 112 is touched or not. When the transmission button 112 is not touched (S139: NO), the CPU 14 returns the procedure to S117. On the other hand, when the transmission button 112 is touched (S139: YES), this is a case where a permission to transmit image data to the multifunction apparatus 10*a* (receiving-side apparatus) is inputted by the user at the transmitting side. Therefore, the CPU 14 advances the procedure to S141, and executes the facsimile transmission process.

Figure 4:
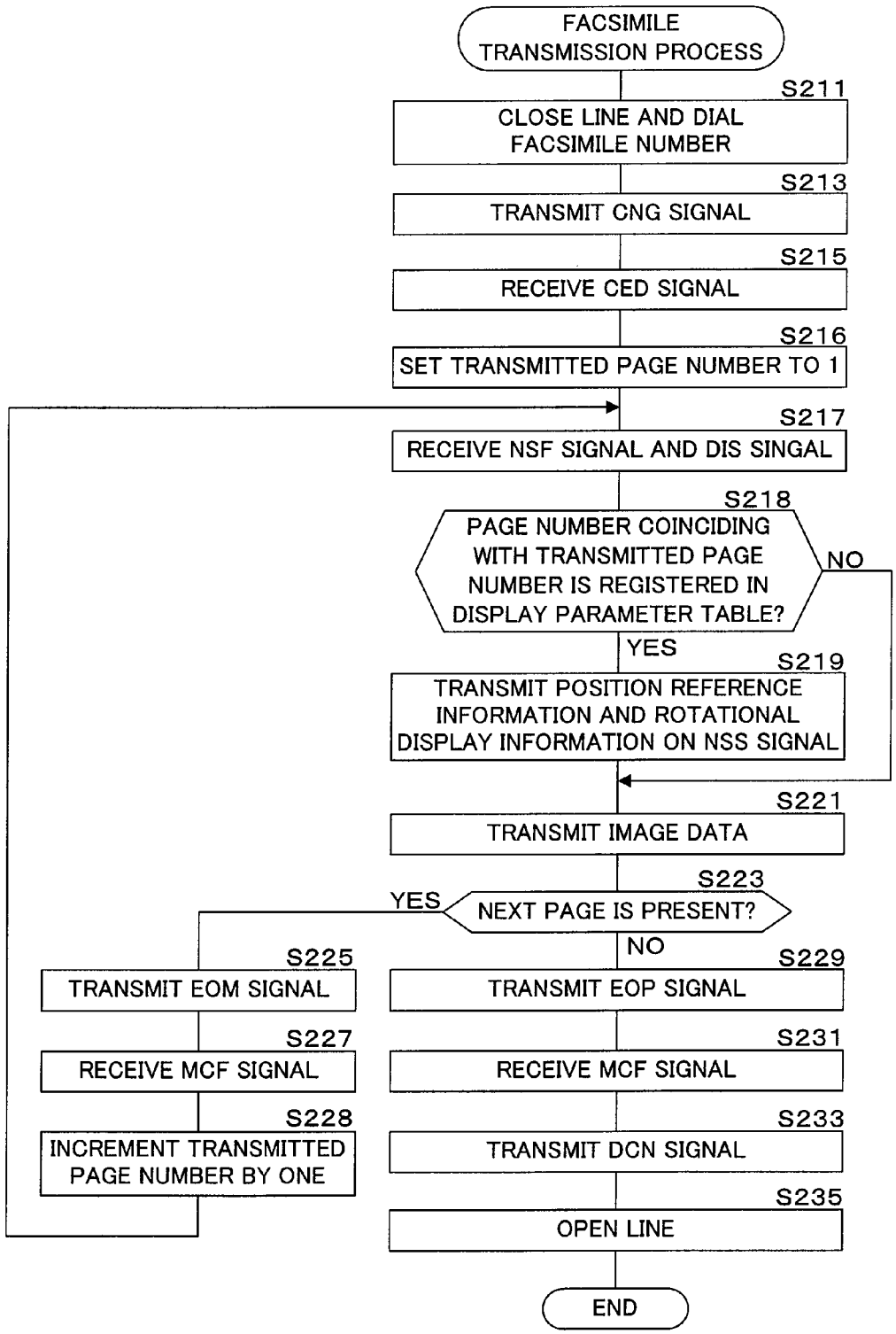
FIG. 4 is a flowchart of the operation of the multifunction apparatus (part 3)

Details of the facsimile transmission process executed at S141 will be described by using the flowchart of FIG. 4. At S211, the CPU 14 closes the line, and dials the facsimile number of the receiving-side apparatus. At S213, the CPU 14 transmits a CNG signal. The CNG signal is a signal that notifies the receiving-side apparatus that this is a facsimile transmission. At S215, the CPU 14 receives a CED signal. The CED signal is an answer signal that the receiving-side apparatus transmits in response to the CNG signal.

At S216, the CPU 14 sets the transmitted page number to 1. The transmitted page number is a pointer indicating which page of a plurality of pages of image data is transmitted. At S217, the CPU 14 receives an NSF signal (non-standard facilities signal) and a DIS signal (digital identification signal).

At S218, the CPU 14 determines whether the page number 311 coinciding with the transmitted page number is registered in the display parameter table TB1 or not. When the page number 311 is not registered (S218: NO), the CPU 14 determines that this is a case where a page for which no display mode is specified is transmitted, skips S219, and advances the procedure to S221. On the other hand, when the page number 311 is registered (S218: YES), the CPU 14 advances the procedure to S219.

At S219, the CPU 14 transmits the position reference information 312 and the rotational display information 313 associated with the page number 311 coinciding with the transmitted page number, on an NSS signal (non-standard facilities set-up signal). At S221, the CPU 14 transmits the image data of one page corresponding to the transmitted page number to the receiving-side apparatus according to the facsimile transmission protocol.

At S223, the CPU 14 determines whether the image data has a next page or not. When the image data has a next page (S223: YES), the CPU 14 advances the procedure to S225. At S225, the CPU 14 transmits an EOM signal (end-of-message signal). At S227, the CPU 14 receives an MCF signal (message confirmation signal). At S228, the CPU 14 increments the transmitted page number by one page, and returns the procedure to S217.

By the above, all the pages of the image data can be transmitted to the receiving-side apparatus by repeating S217 to S228. Regarding the pages for which the display parameter 310 is set, the display parameter can be transmitted together with the image data.

On the other hand, when the image data does not have a next page at S223 (S223: NO), the CPU 14 determines that the transmission of the last page is completed, and advances the procedure to S229. At S229, the CPU 14 transmits an EOP signal (end-of-packet signal). At S231, the CPU 14 receives an MCF signal (message confirmation signal). At S233, the CPU 14 transmits a DCN signal (disconnect signal). At S235, the CPU 14 opens the line. Then, the CPU 14 ends the facsimile transmission process.

Figure 8:
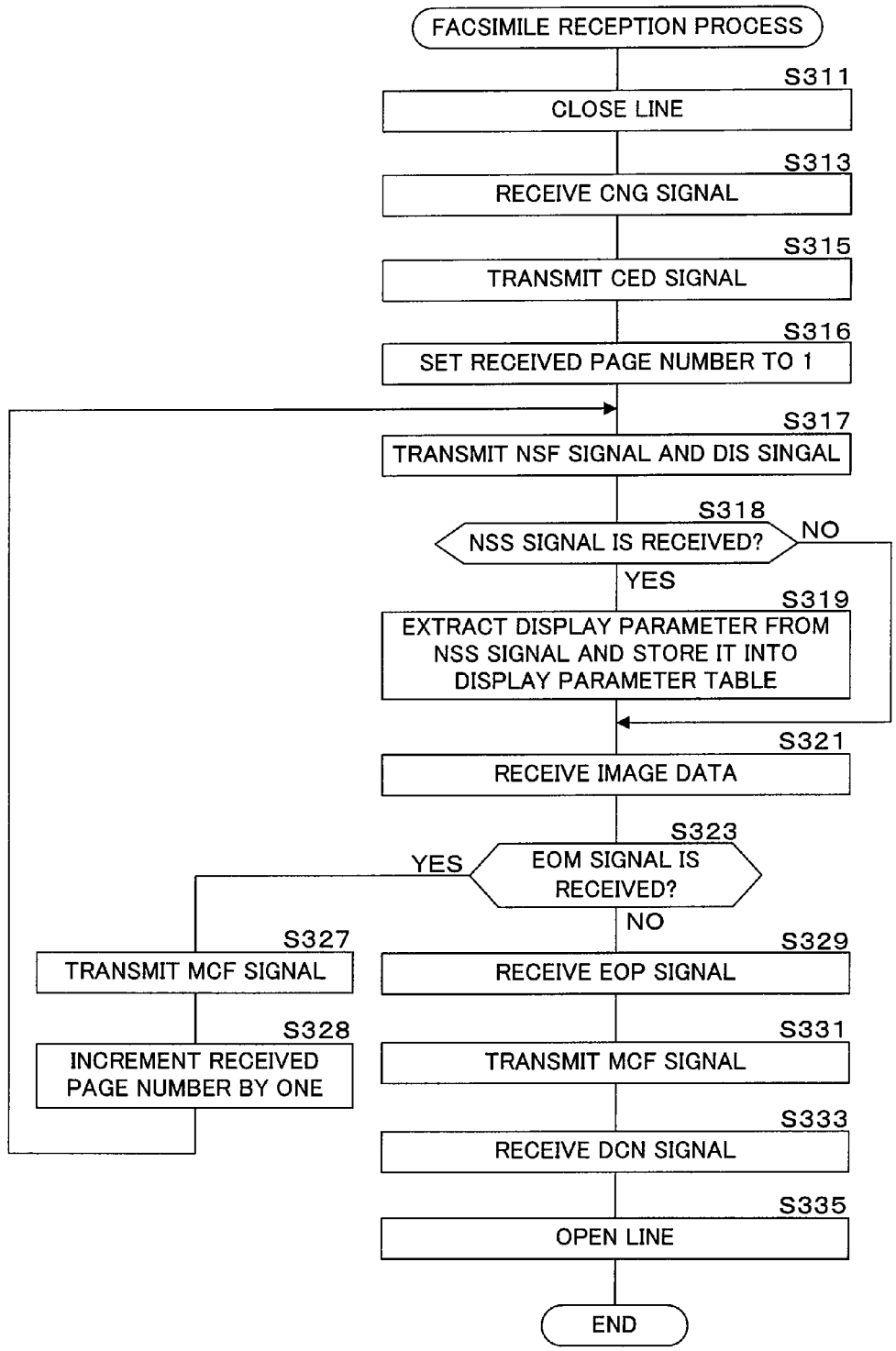
FIG. 8 is a flowchart of the operation of the multifunction apparatus (part 7)

The facsimile reception process performed by the multi-function apparatus 10*a* (receiving-side apparatus) will be described by using the flowchart of FIG. 8. At S311, the CPU 14*a* closes the line. At S313, the CPU 14*a* receives the CNG signal. At S315, the CPU 14*a* transmits the CED signal.

At S316, the CPU 14*a* sets the received page number to 1. The received page number is a pointer indicating which page of a plurality of pages of image data is received. At S317, the CPU 14*a* transmits the NSF signal and the DIS signal. At S318, the CPU 14*a* determines whether the NSS signal has been received or not. When the NSS signal has not been received (S318: NO), the CPU 14*a* determines that this is a case where a page for which no display mode is specified has been received, skips S319, and advances the procedure to S321. On the other hand, when the NSS signal has been received (S318: YES), the CPU 14*a* advances the procedure to S319.

At S319, the CPU 14*a* extracts the display parameter 310 from the NSS signal. Then, the CPU 14*a* stores the page number 311, the position reference information 312 and the rotational display information 313 of the page for which the display parameter is set, into the display parameter table TB1*a*. At S321, the CPU 14*a* receives the image data of one page corresponding to the received page number according to the facsimile transmission protocol.

At S323, the CPU 14*a* determines whether the EOM signal has been received or not. When the EOM signal has been received (S323: YES), the CPU 14*a* advances the procedure to step S327, and transmits the MCF signal. At S328, the CPU 14*a* increments the received page number by one page, and returns the procedure to S317.

By the above, all the pages of the image data can be received by repeating S317 to S328. Regarding the pages for which the display parameter 310 is set, the display parameter can be received together with the image data. Therefore, the contents of the display parameter table TB1 held in the multifunction apparatus 10 (transmitting-side apparatus) can be copied to the display parameter table TB1*a* of the multifunction apparatus 10*a* (receiving-side apparatus).

On the other hand, when the EOM signal has not been received at S323 (S323: NO), the CPU 14*a* advances the procedure to S329. At S329, the CPU 14*a* receives the EOP signal. At S331, the CPU 14*a* transmits the MCF signal. At S333, the CPU 14*a* receives the DCN signal. At S335, the CPU 14*a* opens the line. Then, the CPU 14*a* ends the facsimile reception process.

Figure 5:
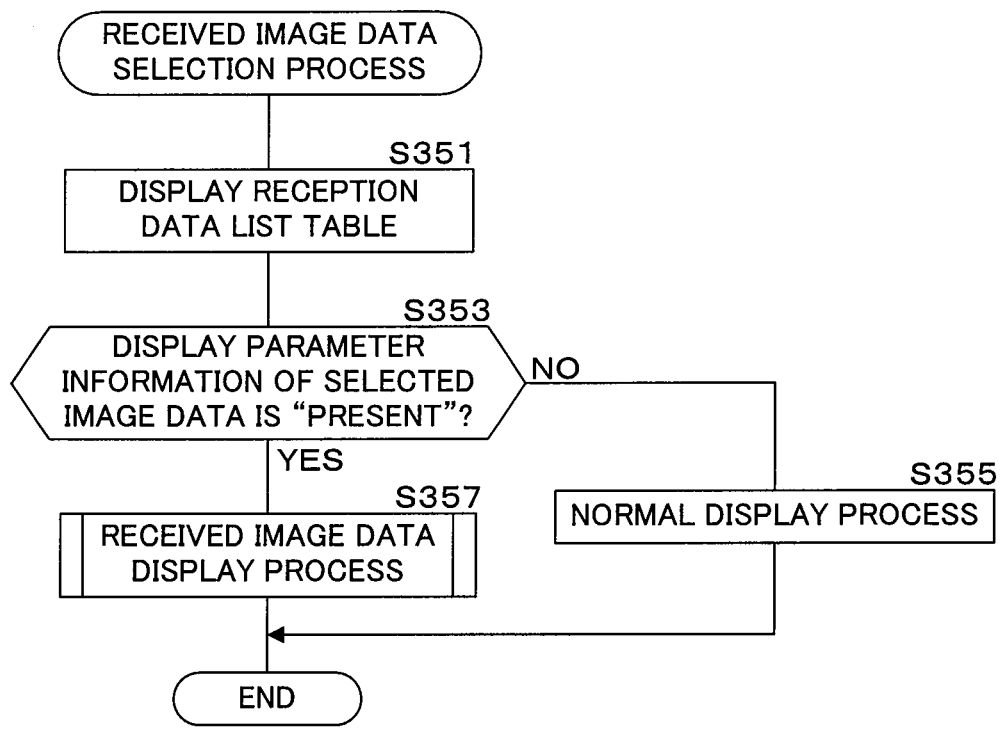
FIG. 5 is a flowchart of the operation of the multifunction apparatus (part 4)

The received image data selection process in the multifunction apparatus 10*a* (receiving-side apparatus) will be described by using the flowchart of FIG. 5. The operation procedure in FIG. 5 is initiated by the user touching the reception list display button 113 displayed on the touch panel 50*a*. At S351, the CPU 14*a* displays the reception data list table TB2*a* (FIG. 11) on the touch panel 50*a*. The user selects the reception number 211 of the image data to be displayed on the touch panel 50*a*, from the reception data list table TB2*a*.

At S353, the CPU 14*a* determines whether the display parameter information 214 of the selected image data is "present" or not. When the display parameter information 214 is not "present" (S353: NO), the CPU 14*a* advances the procedure to S355, and performs the normal display process. In the normal display process, the coordinates of the origin P0 (FIG. 12) are used as the position reference information 312. Therefore, the display region 450 is placed with the origin P0 at the upper left corner. Then, the region trimmed off by the display region 450 is displayed on the touch panel 50*a*. Moreover, in response to the user touching the printing button 114, the image data is printed by using the printing section 54*a*.

On the other hand, when the display parameter information 214 of the selected image data is "present" at S353 (S353: YES), the CPU 14*a* advances the procedure to S357. At S357, the CPU 14*a* performs the received image data display process.

Figure 6:
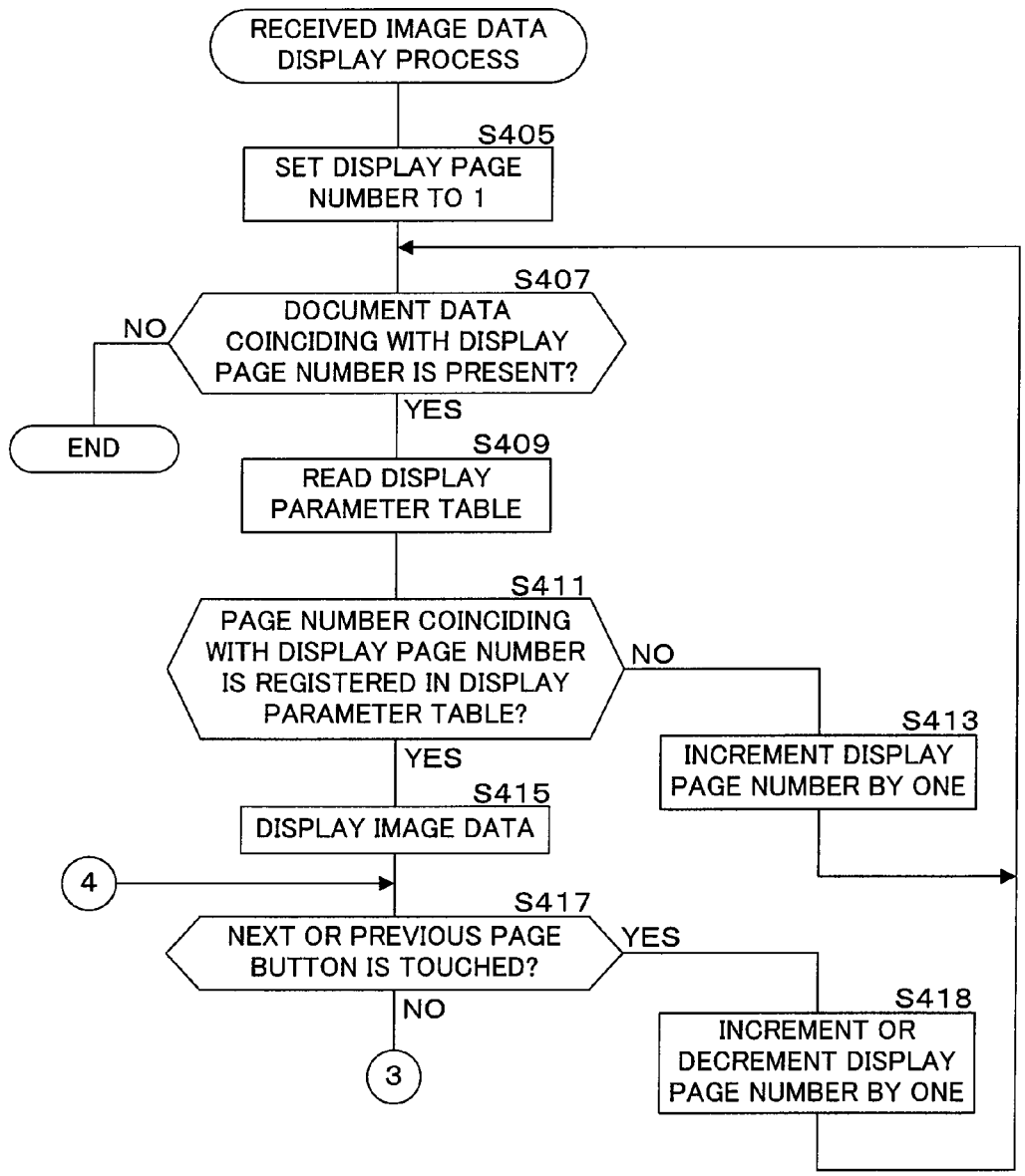
FIG. 6 is a flowchart of the operation of the multifunction apparatus (part 5)
Figure 7:
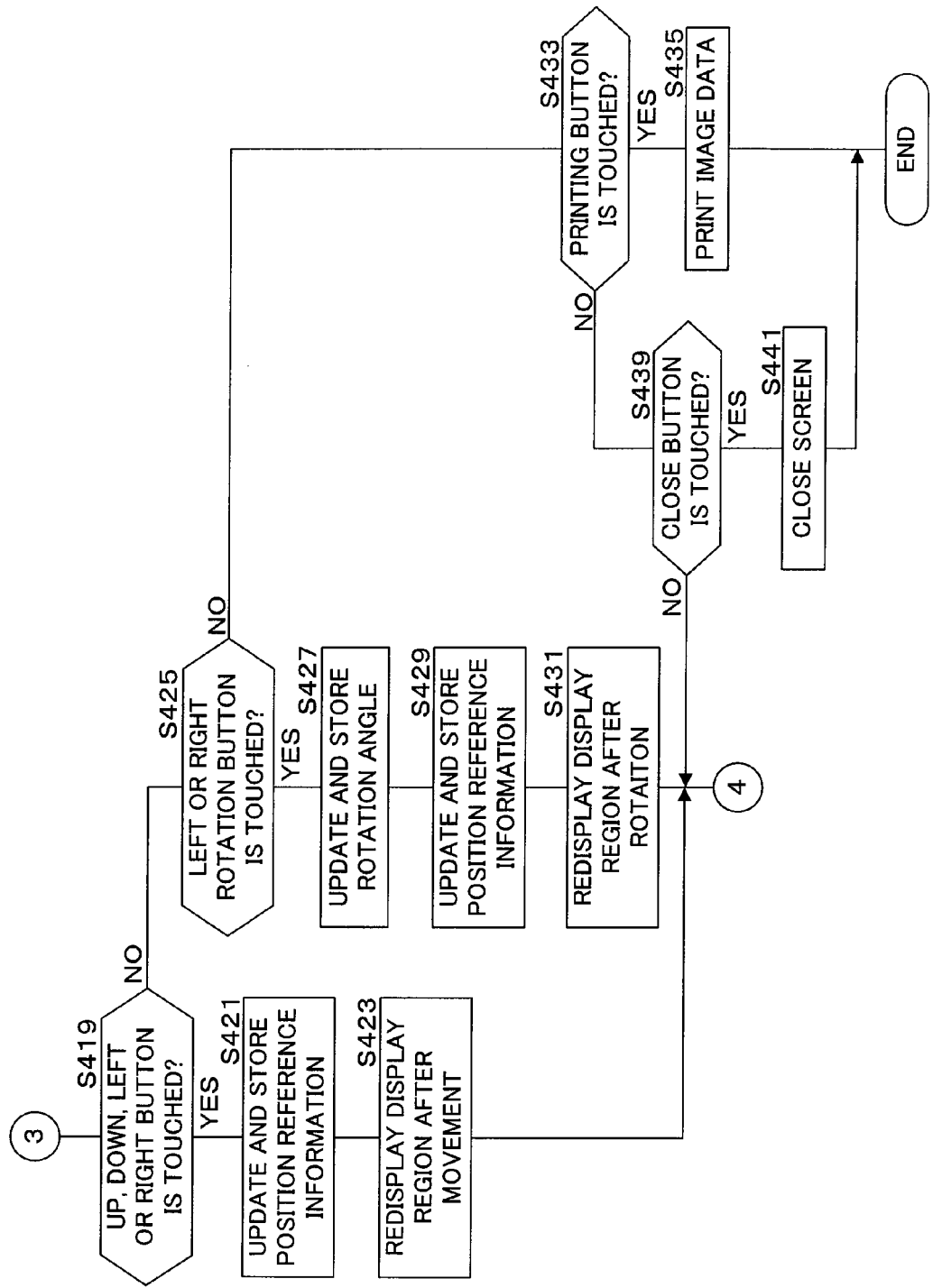
FIG. 7 is a flowchart of the operation of the multifunction apparatus (part 6)

Details of the received image data display process performed at S357 will be described by using the flowcharts of FIG. 6 and FIG. 7. At S405, the CPU 14*a* sets the display page number to 1. The display page number is a pointer indicating which page of a plurality of pages of image data is to be displayed.

At S407, the CPU 14*a* determines whether a page coinciding with the display page number is present among the page numbers of the document data or not. When the page is not present (S407: NO), the CPU 14*a* determines that there is no page to be displayed, and ends the operation procedure. On the other hand, when the page is present (S407: YES), the CPU 14*a* advances the procedure to S409.

At S409, the CPU 14*a* reads the display parameter table TB1*a* from the NVRAM 40*a*. At S411, the CPU 14*a* determines whether the page number 311 coinciding with the display page number is registered in the display parameter table TB1*a* or not. When the page number 311 is not registered (S411: NO), the CPU 14*a* determines that this is a case where a page for which no display mode is specified is displayed, and advances the procedure to S413. At S413, the CPU 14*a* increments the display page number by one page, and returns the procedure to S407.

On the other hand, when the page number coinciding with the display page number is registered (S411: YES), the CPU 14*a* advances the procedure to S415. At S415, the CPU 14*a* displays the image data on the touch panel 50*a* according to the display parameter 310.

In the example of description of the present embodiment, a display mode when the display page number is 1 will be described. In this case, in the display parameter table TB1*a* of FIG. 10, the display parameter 310 (the position reference information 312=(30,60), the rotational display information 313=0 degrees) of the page number 311=1 is used. Therefore, as shown in FIG. 12, the display region 450 is placed with reference to the upper left corner position P1=(30,60). Then, the region trimmed off by the display region 450 is displayed on the touch panel 50*a* (FIG. 9).

At S417, the CPU 14*a* determines whether the next page button 102 or the previous page button 101 displayed on the touch panel 50*a* is touched or not. When the next page button 102 is touched (S417: YES), the CPU 14*a* advances the procedure to S418, increments the display page number by one page, and then, returns the procedure to S407. When the previous page button 101 is touched (S417: YES), the CPU 14*a* advances the procedure to S418, decrements the display page number by one page, and then, returns the procedure to S407. On the other hand, when neither the next page button 102 nor the previous page button 101 is touched (S417: NO), the CPU 14*a* advances the procedure to S419 (FIG. 7).

At S419, the CPU 14*a* determines whether any of the up button 103, the down button 104, the left button 105 and the right button 106 is touched by the receiving-side user or not. When any of these buttons is touched (S419: YES), the CPU 14*a* advances the procedure to S421. At S421, the CPU 14*a* stores the coordinates of the upper left corner position P1 of the display region 450 after the movement, into the RAM 30*a*. At S423, the CPU 14*a* redisplays the region trimmed off by the display region 450 on the touch panel 50*a*. Then, the CPU 14*a* returns the procedure to S417.

On the other hand, when none of the buttons is touched by the receiving-side user at S419 (S419: NO), the CPU 14*a* advances the procedure to S425. At S425, the CPU 14*a* determines whether the left rotation button 107 or the right rotation button 108 is touched by the receiving-side user or not. When either of the buttons is touched (S425: YES), the CPU 14*a* advances the procedure to S427, and stores the rotation angle after the change into the RAM 30*a*. At S429, in the display region 450 after the rotation, the CPU 14*a* updates the coordinates of the upper left corner position P1 of the display region 450. At S431, the CPU 14*a* redisplays the part trimmed off by the display region 450 after the rotation, on the touch panel 50*a*. Then, the CPU 14*a* returns the procedure to S417.

On the other hand, when none of the buttons is touched at S425 (S425: NO), the CPU 14*a* advances the procedure to S433. At S433, the CPU 14*a* determines whether the printing button 114 is touched by the receiving-side user or not. When the printing button 114 is touched (S433: YES), the CPU 14*a* advances the procedure to S435, and prints the image data. Then, the CPU 14*a* ends the operation procedure.

In the printing process of S435, the region specified by the display parameter information 214 may be printed in a mode different from the other region. For example, a case will be described where a page is printed for which the display parameter 310 (the position reference information 312=(30, 60), the rotational display information 313=0 degrees) of the page number 311=1 is used in the display parameter table TB1*a* of FIG. 10. In this case, as shown in FIG. 12, the display region 450 is specified with reference to the upper left corner position P1=(30,60). When the whole of the image data region 401 is printed, only the display region 450 is printed so as to be shaded or in color. Thereby, the region specified by the transmitting-side user can be printed in a mode that can be clearly recognized by the receiving-side user. Consequently, user convenience can be improved.

On the other hand, when the printing button 114 is not touched at S433 (S433: NO), the CPU 14*a* advances the procedure to S439. At S439, the CPU 14*a* determines whether the close button 115 is touched by the receiving-side user or not. When the close button 115 is not touched (S439: NO), the CPU 14*a* returns the procedure to S417, and when the close button 115 is touched (S439: YES), the CPU 14*a* advances the procedure to S441. At S441, the CPU 14*a* closes the screen displayed on the touch panel 50*a*. Then, the CPU 14*a* ends the operation procedure.

Effects of the multifunction apparatus according to the present embodiment will be described. With the multifunction apparatus of the present embodiment, the transmitting-side user can previously specify the page that he/she wants the receiving-side user to look at when performing facsimile transmission. In the multifunction apparatus at the receiving side, the page specified by the transmitting-side user is preferentially displayed. Consequently, the receiving-side user can smoothly check the contents of the image data according to the transmitting-side user's intention.

Moreover, in the multifunction apparatus of the present embodiment, the transmitting-side user can previously specify the position of the image data that he/she wants the receiving-side user to look at when performing facsimile transmission. In the multifunction apparatus at the receiving side, the position specified by the transmitting-side user is displayed on the touch panel. Consequently, user convenience can be improved.

Moreover, in the multifunction apparatus of the present embodiment, the transmitting-side user can previously specify the rotation angle according to the orientation (horizontally, vertically, etc.) of the image data when performing facsimile transmission. In the multifunction apparatus at the receiving side, the image data is displayed on the touch panel by applying the rotation angle specified by the transmitting-side user. Consequently, the orientation of the image data when the image data is displayed on the touch panel at the receiving side can be prevented from being at variance with the actual orientation of the image data.

Moreover, in the multifunction apparatus of the present embodiment, the display parameter can be set by touching the position determination button 111 after displaying the image data in a desired display position and at a desired rotation angle on the touch panel of the multifunction apparatus at the transmitting side. Thereby, the display parameter can be intuitively set by using visual sense with the touch panel at the transmitting side, so that user convenience can be improved.

While concrete examples have been described in detail, these are merely for purposes of illustration, and do not limit the claims. The art described in the claims includes various modifications and variations of the concrete examples shown above.

The contents of the rotational display information 313 are not limited to the rotation angle. For example, rotation patterns where the display region 450 is placed in various rotational modes on the image data region 401 may be previously prepared. In this case, the rotation pattern selected by the user is used as the rotational display information 313.

Moreover, the contents of the position reference information 312 are not limited to the coordinates on the image data region 401. For example, it may be performed to use the number of lines of the facsimile data as the position reference information 312 and place the display region 450 with reference to the number of lines. Moreover, for example, the number of scrolls in the vertical or horizontal direction on the touch panel of the multifunction apparatus at the transmitting side may be used as the position reference information 312. In this case, since the movement amount per scroll is known, the upper left corner position P1 can be calculated by using the number of scrolls.

Moreover, the mode of application of the rotational display information 313 when the image data is displayed on the touch panel of the multifunction apparatus at the receiving side may be various modes. For example, it may be performed to apply the rotational display information 313 to the image data and rotate the image data before displaying it on the touch panel. Moreover, it may be performed to apply the rotational display information 313 and rotate the image after displaying the image data on the touch panel 50*a*.

Moreover, in the printing process of S435 (FIG. 7), printing of various modes can be performed. For example, when the position or the orientation of the display region 450 specified by the display parameter information 214 is changed by the receiving-side user's operation (S419, S425), it may be performed to print only the display region 450 after the change so as to be shaded or in color. Thereby, the region to which the receiving-side user pays attention can be printed in a mode that can be clearly recognized by the receiving-side user. Consequently, a case can be handled where the transmitting-side user and the receiving-side user pay attention to different regions of the image data region 401. Moreover, it may be performed to print both the display region 450 specified by the transmitting-side user and the display region 450 whose position and orientation are changed by the receiving-side user, in a mode different from the other region. For example, it may be performed to print the display region 450, specified by the transmitting-side user, so as to be shaded and print the display region 450, changed by the receiving-side user, in color. Thereby, the regions to which the transmitting-side user and the receiving-side user pay attention can be printed in a mode that can be clearly recognized by the receiving-side user.

Moreover, the technical elements described in the specification or the drawings deliver technical usefulness alone or in various combinations, and the combinations are not limited to those described in the claims as filed. Moreover, the art illustrated in the specification or the drawings simultaneously achieves a plurality of purposes, and achieving one of the purposes itself exhibits technical usefulness.

The touch panel 50 is an example of the transmitting-side display section. The touch panel 50a is an example of the receiving-side display section. The multifunction apparatus 10a is an example of the receiving-side apparatus. The page number 311 is an example of the page information.

Moreover, the control section that executes S111 is an example of the image data generating unit. The control section that executes S115 and S415 is an example of the displaying unit. The control section that executes S139 is an example of the input accepting unit. The control section that executes S119 to S135 is an example of the display parameter setting unit. The control section that executes S219 is an example of the transmitting unit. The control section that executes S321 is an example of the image data receiving unit. The control section that executes S319 is an example of the display parameter receiving unit. The control section that executes S435 is an example of the printing unit. The control section that executes S351 is an example of the listing unit.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A facsimile apparatus comprising:
an image data generating unit configured to generate image data;
a displaying unit configured to display the image data on a transmitting-side display section;
an input accepting unit configured to accept an input of a permission to transmit the image data to a receiving-side apparatus;
a display parameter setting unit configured to set a display parameter to specify a display mode when the image data received by the receiving-side apparatus is displayed on a receiving-side display section of the receiving-side apparatus; and
a transmitting unit configured to transmit the image data together with the display parameter to the receiving-side apparatus in response to the input accepting unit accepting the input of the permission to transmit the image data.

2. The facsimile apparatus according to claim 1, wherein the display parameter includes position reference information specifying a position of the image data serving as a reference when at least part of the image data is displayed on the receiving-side display section.

3. The facsimile apparatus according to claim 2, wherein the display parameter setting unit is configured to set coordinates, corresponding to a predetermined position of the transmitting-side display section, of the image data displayed on the transmitting-side display section, as the position reference information.

4. The facsimile apparatus according to claim 1, wherein the display parameter includes rotational display information specifying an amount by which the image data is rotated when at least part of the image data is displayed on the receiving-side display section.

5. The facsimile apparatus according to claim 4, wherein the display parameter setting unit is configured to set an angle corresponding to a rotation condition of the image data displayed on the transmitting-side display section, as the rotational display information.

6. The facsimile apparatus according to claim 1, wherein the image data generating unit is configured to assign, when generating one or a plurality of pieces of image data, a page number to the image data in order, and
the display parameter includes page information specifying, when the image data is displayed on the receiving-side display section, a page number assigned to the image data to be displayed.

7. A facsimile apparatus comprising:
an image data receiving unit configured to receive image data and to store the image data into a storage section;
a display parameter receiving unit configured to receive a display parameter to specify a display mode when the image data is displayed on a receiving-side display section and to store the display parameter into the storage section; and
a displaying unit configured to display the image data stored in the storage section on the receiving-side display section by using the display mode specified by the display parameter.

8. The facsimile apparatus according to claim 7, wherein the display parameter includes position reference information specifying a position of the image data serving as a reference when the image data is displayed on the receiving-side display section, and
the displaying unit displays at least part of the image data on the receiving-side display section with reference to the position reference information.

9. The facsimile apparatus according to claim 8, wherein coordinates corresponding to a predetermined position of a transmitting-side display section of the image data displayed thereon are set as the position reference information.

10. The facsimile apparatus according to claim 7, wherein the display parameter includes rotational display information specifying an amount by which the image data is rotated when the image data is displayed on the receiving-side display section, and
the displaying unit displays at least part of the image data on the receiving-side display section while rotating the image data based on the rotational display information.

11. The facsimile apparatus according to claim 10, wherein an angle corresponding to a rotation condition of the image data displayed on a transmitting-side display section is set as the rotational display information.

12. The facsimile apparatus according to claim 7, wherein a page number is assigned to one or a plurality of pieces of image data in order,
the display parameter includes page information to specify the page number assigned to the image data to be displayed on the receiving-side display section, and
the displaying unit is configured to select the image data to be displayed, based on the page information, and then, display at least part of the selected image data on the receiving-side display section.

13. The facsimile apparatus according to claim 8, further comprising:
an printing unit configured to print the image data onto printing paper,
wherein the printing unit is configured to print a region identified by the position reference information in a mode different from another region.

14. The facsimile apparatus according to claim 7, wherein the image data includes image data with display parameter transmitted together with the display parameter and image data without display parameter transmitted alone,
further comprising a listing unit configured to list information on the image data with display parameter and the image data without display parameter stored in the storage section, on the receiving-side display section,
wherein the listing unit is configured to make the display mode of the information on the image data with display parameter different from the display mode of the information on the image data without display parameter.

15. A facsimile apparatus comprising:
a processor; and
memory storing machine readable instructions that, when executed, cause the facsimile apparatus to:
generate image data;
display the image data on a transmitting-side display section;
accept an input of a permission to transmit the image data to a receiving-side apparatus;
set a display parameter to specify a display mode when the image data received by the receiving-side apparatus is displayed on a receiving-side display section of the receiving-side apparatus; and
transmit the image data together with the display parameter to the receiving-side apparatus in response to accepting the input of the permission to transmit the image data.

* * * * *